United States Patent Office 3,455,470
Patented July 15, 1969

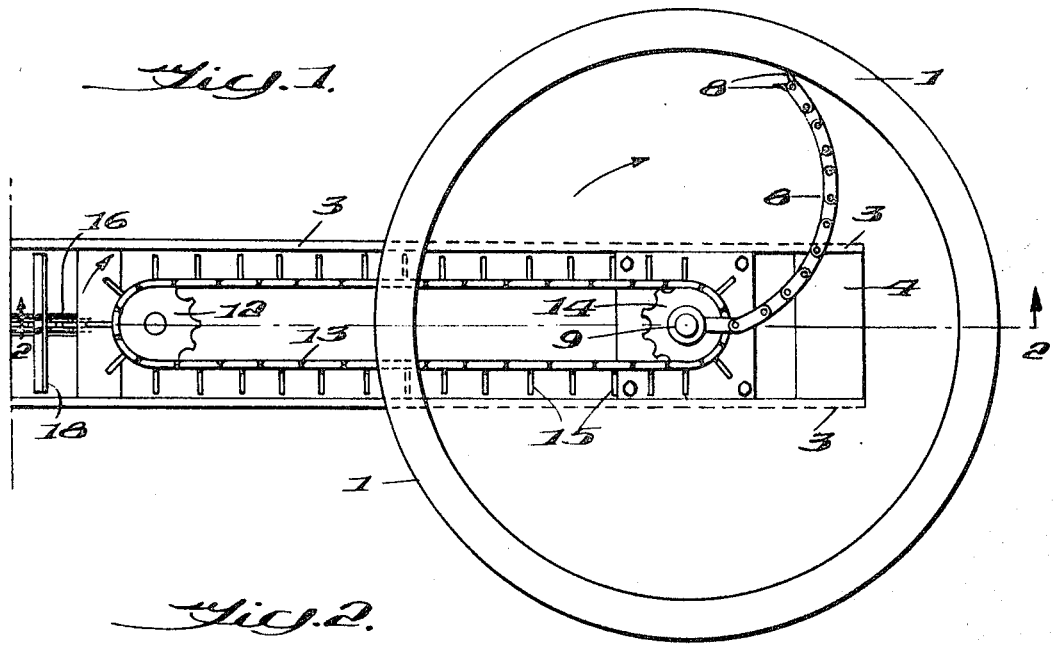
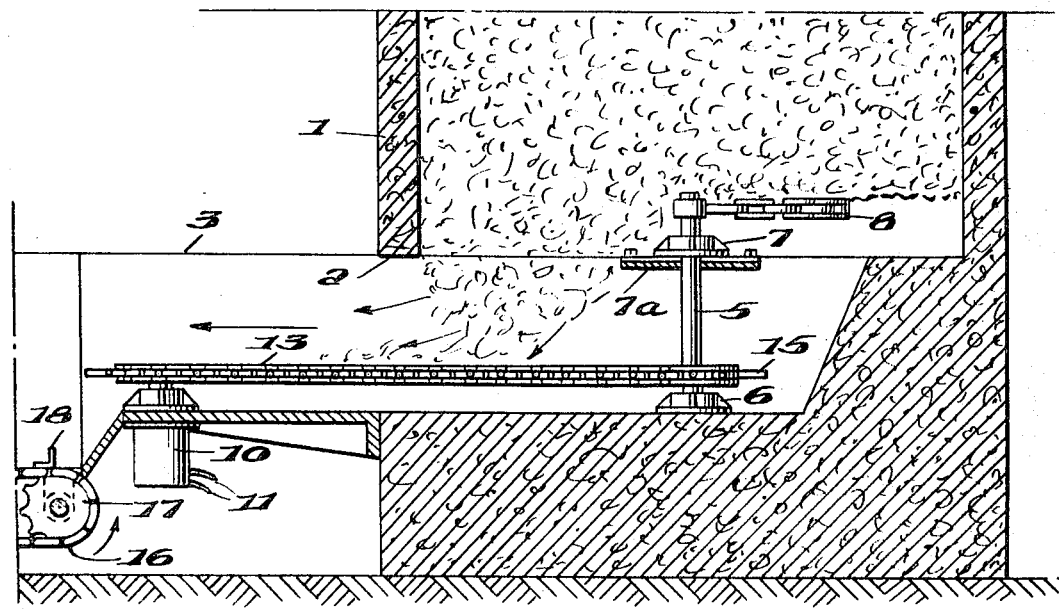

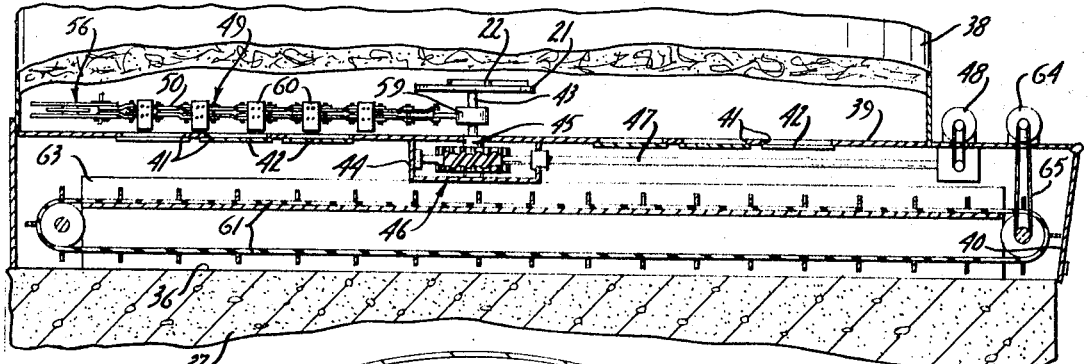
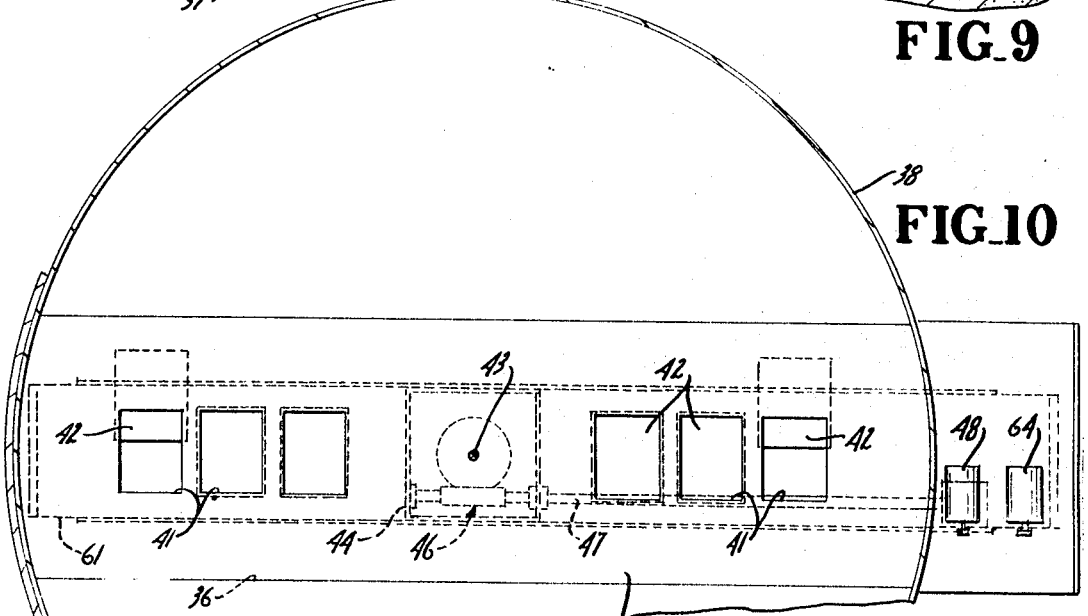
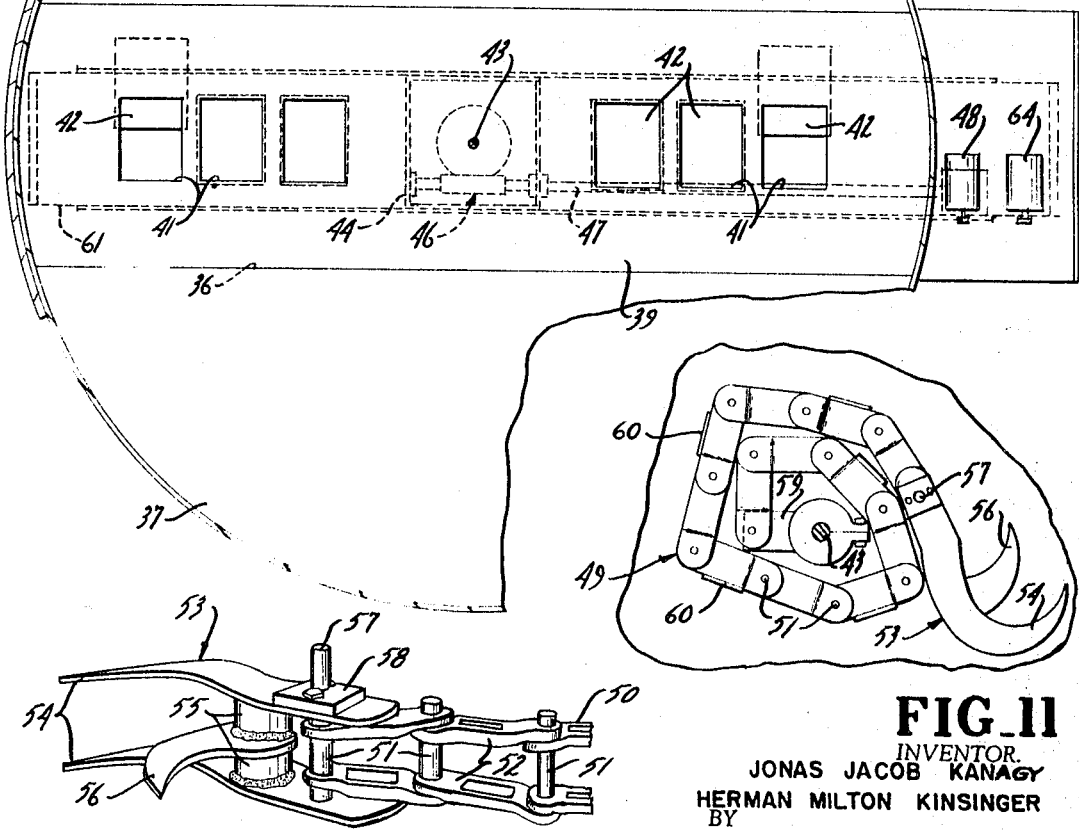

3,455,470
FLAIL TYPE BOTTOM UNLOADER FOR SILOS
Jonas Jacob Kanagy and Herman Milton Kinsinger, both of Rte. 1, Box 573, Stuarts Draft, Va. 24477
Continuation-in-part of application Ser. No. 651,430, July 6, 1967. This application Mar. 7, 1968, Ser. No. 716,687
Int. Cl. B65g 65/58
U.S. Cl. 214—17            4 Claims

ABSTRACT OF THE DISCLOSURE

This invention relates to a flail type bottom unloader and associated unloader apparatus for cutting and removing ensilage and other material from the bottom of a silo. Details pertain to the vertically rigid laterally flexible cantilevered unloader arm and the cutter member at the outer end of the arm for cutting the under surface of the stored material associated with discharge means, including a slotted floor in the silo and a conveyor located beneath the slots to pass the loosened material exteriorly of the silo.

---

This application is a continuation-in-part of application Ser. No. 651,430, filed July 6, 1967, now abandoned and entitled, "Means for Removing Ensilage from Silos," and relates to a bottom unloader and associated unloader apparatus for unloading ensilage or other material from the bottom of a silo.

The mechanism provides for the use of a cutting member or bottom unloader adapted to cut or loosen the under surface, for example, of a stack of ensilage located in a silo so that the particles thus loosened may drop downwardly and be removed laterally at the ground level or below it to some exterior point for ultimate use. The mechanism for cutting the ensilage loose includes an upright shaft extending above the floor of the silo mounted in suitable bearings and having attached thereto adjacent the top thereof a substantially vertically rigid laterally flexible cantilevered arm having a cutter member at the outer end thereof with the arm adapted to be revolved by rotary motion of the shaft whereby the cutter member cuts the ensilage loose so that it may drop and be moved by the unloader to the discharge openings. The unloader arm may be a substantially vertically rigid laterally flexible cantilevered chain which has the inner end secured to the shaft and an outer free end carrying an anticlogging cutter member. The cantilevered chain when rotated by the shaft extends laterally toward the silo wall or the unloader arm may be in the nature of a section of vertically rigid but laterally flexible pipe extending laterally from the shaft and rotated thereby which has a cutter member at the outer end for dislodging silage or the like.

Associated with the shaft and unloader arm is an anticlogging device located above the shaft and lying over the unloader arm in the area of the shaft to prevent loosened ensilage from jamming the arm when the unloader is used in certain types of materials, the anticlogging device including a conically shaped shield adapted to rotate with the shaft and having a downwardly and outwardly sloping upper surface whereby particles of ensilage which might have a tendency to fall before being cut are distributed laterally.

The unloader and its bearings are firmly mounted in a suitable foundation means such as a concrete base.

Associated with the silo and the upright shaft and bottom unloader is mechanism for removing the loosened ensilage. This includes a tunnel beneath the silo floor extending from the center of the silo. The tunnel may be in the surface of the earth beneath the silo base or in the base or cement foundation of the silo itself which provides a floor for the bottom of the silo. The trough formed by the tunnel has a bottom and upright side walls whereby ensilage may be moved from the lower part of the silo exteriorly to any desired location. Power driven conveyor means extending lengthwise of the trough is an essential feature. The motor mechanism for propelling the silo and for rotating the upright shaft within the silo may be mounted and located wherever desired. Preferably the means for rotating the shaft will include a chain leading from a suitable motor to a gear associated with the upright shaft.

One of the distinctive advantages of this tunnel and trough combination is that it affords access for a mechanic to enter the lower part of the silo to adjust the shaft and the unloader mechanism. This means of access to the interior of the silo also affords opportunity for the introduction and removal of the conically shaped baffle or anticlogging device which is separable into two halves for convenient installation and removal.

Although the ensilage or other material in the silo may be removed by the unloader through a central opening provided around the central drive shaft, it is contemplated that additional control over certain types of stored material can best be accomplished by providing access to the discharge tunnel by means of spaced discharge slots in the floor of the structure overlying the tunnel. Such slots are provided with doors or gates which are adjustable to regulate the size of the slots and thereby control the flow of discharged material through the slots and into the discharge tunnel. The tunnel also may be provided with a door at its outer end or ends so that the tunnel may be sealed off from the atmosphere when material is not being unloaded from the structure.

The foregoing features are described in detail and claimed in the following specification and claims and will be understood when considered in connection with the accompanying drawings in which:

FIGURE 1 shows a top plan view of the wall of a silo having an unloader comprising a cutter mechanism and chain type cantilevered flail and a power driven chain within a trough and extending outwardly from within the silo to a point exteriorly of the silo;

FIG. 2 is a vertical section taken on the line 2—2 of FIGURE 1 showing a side view of the upright drive shaft and chain type cantilevered flail and with a motor located exteriorly of the silo;

FIG. 9 is a longitudinal sectional view further illustrating the flail type unloader with other discharge and unloader apparatus;

FIG. 10 is a top plan view illustrating the slots in the floor of the structure leading to the discharge tunnel and with one of the slots partially closed to show control of flow of material through the slots;

FIG. 11 is a top plan view illustrating the wrapping of the unloader around the drive shaft, the starting position of the unloader when the silo is full; and FIG. 12 is a perspective view of another cutter member.

Figure 3:
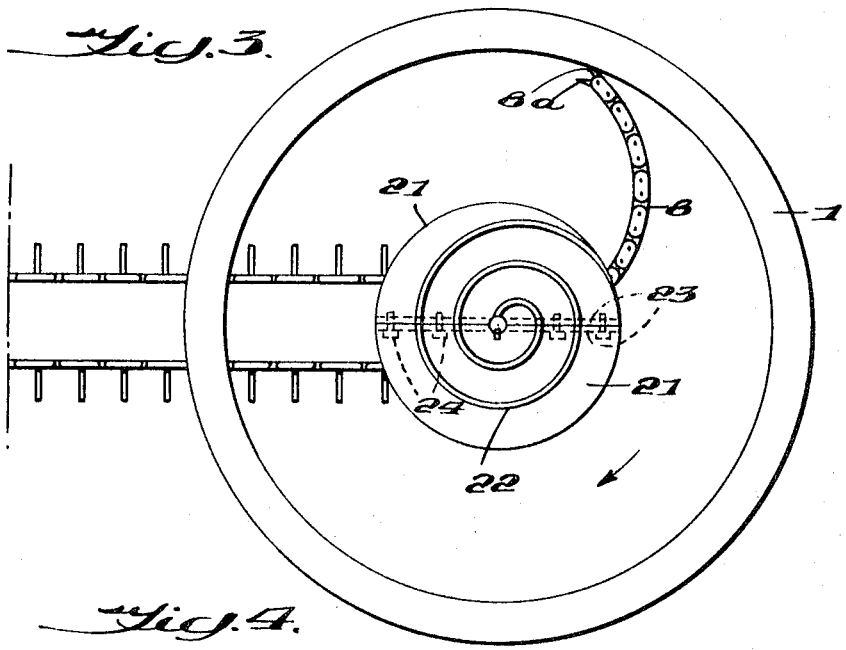
FIG. 3 shows a view similar to that of FIGURE 1 but illustrating the use of an anticlogging shield mounted at the upper end of the drive shaft and above the drive shaft end of the chain flail.
Figure 4:
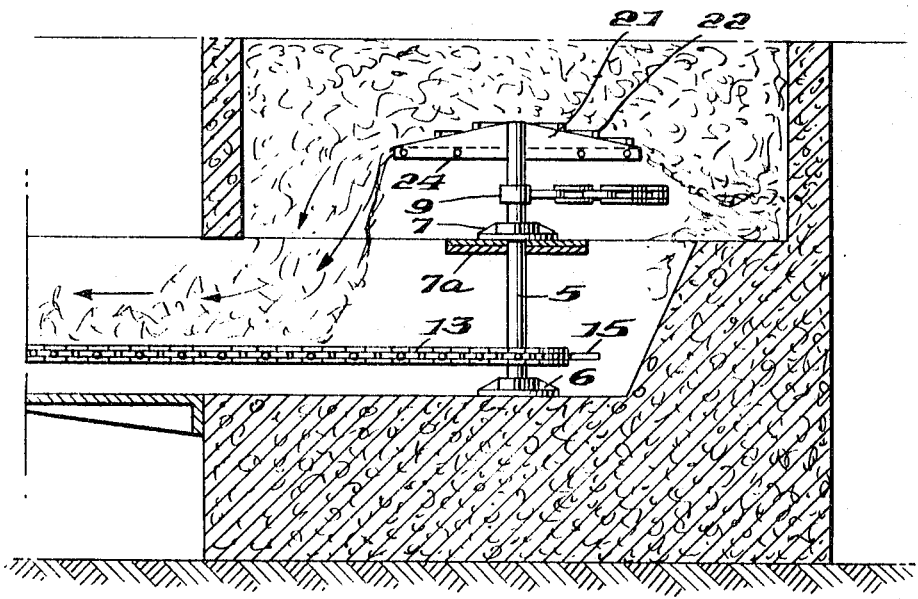
FIG. 4 is a vertical section showing a side view of the mounting of the anticlogging cone shape element at the upper end of the drive shaft.

Referring in detail to the several figures of the drawing, 1 identifies the cylindrical wall of a silo. 2 is the opening of the tunnnel leading through the wall 1, as shown in FIGURES 2 and 4. 3 is the upper edge of the trough in the floor of the silo extending from within the silo outwardly to a point exteriorly thereof. The trough has a floor 4 and the tunnel need be only large enough to receive the trough. The drive shaft 5, as shown in FIGURES 1–4 is positioned centrally of the silo and at the base thereof and extends upwardly above the floor of the silo. The lower end of the drive shaft 5 is supported by a bearing 6 and the upper portion of the shaft is supported in a journal bearing 7. Additional means for supporting the upper portion of the shaft 5 is provided by brace members 7a which are adapted to extend across the trough and have ends mounted in the foundation of the base of the silo.

At the upper end portion of the shaft 5, an unloader chain 8 is coupled by means of a clamp member 9 which is secured to the shaft 5 and is adapted to be swung around as the shaft is rotated. Preferably, the chain 8 will extend substantially to the inner wall of the silo so as to cut ensilage from the under surface of a stack of ensilage within the silo. As can be readily observed in the drawings, FIGURES 1 and 2, for example, the chain 8 is cantilevered and vertically rigid throughout its length but is laterally flexible so that it in effect can wrap itself upon itself and around the central shaft as it initially engages material to be removed and then gradually unwrap itself by centrifugal force generated by rotation of shaft 5 to thereby overcome the resistance of the material and dislodge and remove the same.

Power mechanism for driving the shaft 5 is provided by an electric motor 10 supplied with electricity from any suitable source through the leads 11. The motor 10 drives a gear 12 and through that gear a chain 13 transmits the power to a gear 14 located concentrically with the shaft 5. The chain 13 carries a series of blades 15 which serve to pass loosened ensilage laterally and outwardly through the trough. It is therefore clear that the chain should be located fairly closely to the bottom of the trough. In lieu of a chain 13, the drive to the shaft 5 may be through a suitable conventional rotatable shaft.

Ensilage discharged from the outer end of the tunnel and exteriorly of the silo is passed to an endless conveyor belt 16 which is driven by a sprocket wheel 17. The belt 16 carries a series of cross blades 18 which extend substantially across the width of the trough. As illustrated in FIGURE 2, it is convenient to locate the tunnel slightly above the level of the conveyor belt 16.

The anticlogging device will now be described. This element 21 is of conical shape mounted with its center directly above the upper end of the shaft 5. It consists of two halves adapted to be bolted together as indicated in FIGURE 3, the halves being secured by screw bolts 24 passing through downwardly extending flanges 23. On its upper surface, the cone member 21 carries a spiral shaped distributor 22, the inner end of which is supported at a point about in alignment with the shaft 5 and the outer end of which spiral terminates adjacent the lateral edge of the cone member 21. The distributor element 22 during the rotation of the shaft 5 serves to direct particles of ensilage outwardly to be discharged laterally from the cone 21. Preferably, the distributor element 22 is shaped as a ribbon with its wall upright and its lower edge resting on and secured to the upper surface of the cone 21 as by welding.

Figure 5:
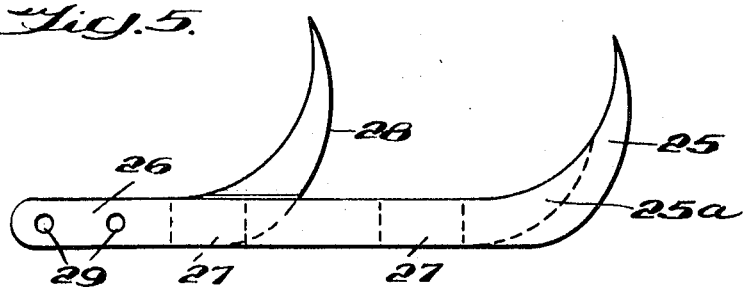
FIG. 5 is a plan view of a modified form of the knife elements for the extreme outer end of the chain type cutter.
Figure 6:
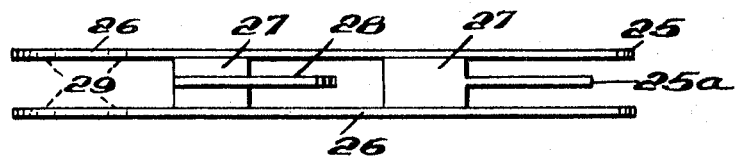
FIG. 6 is a side view of the cutters shown in FIG. 5.

Referring to FIGURES 1 and 3, it will be observed that the extreme outer end of the chain flail arm 8 carries sharpened cutter elements 8a, the points of which diverge. Optionally, the cutter elements may follow the shape of the knives shown in FIGURES 5 and 6 and in which 25 identifies two knives of the same length adapted to be mounted at the extreme end of the chain flail arm 8. The device which carries the two knives 25 is formed of two spaced members 26 shown in FIGURE 6 as flat strips of metal preferably of tool steel. In between the two spaced members 26 are intermediate connecting members 27 which carry a short cutter or knife member 25a between and spaced from the cutter members 25. One of the connecting members 27 also carries the cutter knife 28, as shown in FIGURES 5 and 6. The end of the plate member 26 opposite the cutter 25 is provided with holes 29 through which fastening bolts may be passed to mount the plate member 26 on the end of the chain 8.

FIGURE 6 is a side view of the structure shown in FIGURE 5. The connecting members 27 may be welded to the plate members 26.

Figure 7:
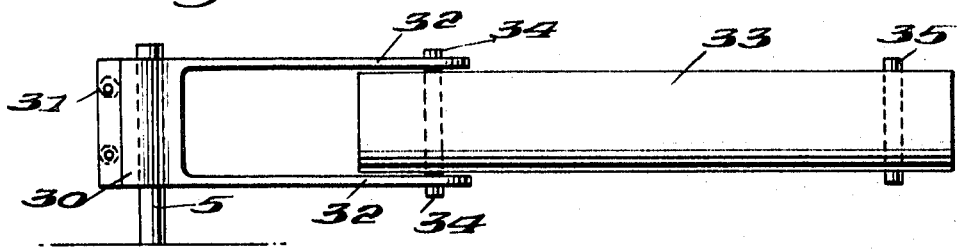
FIG. 7 is a side view of a modified type of cutter arm in which a section of pipe is carried by the vertical shaft instead of a chain, as shown in FIGURE 1.

A side view of a modified form of cutter means is shown in FIGURE 7 as clamped to the upright shaft 5. This type of cutter means shows clamping arms 30 embracing the upright shaft 5 and secured by bolts 31. Laterally projecting spaced arms 32 serve for the mounting of a cutting bar consisting of a vertically rigid laterally flexible cantilevered pipe 33 mounted on the arms 32 and secured by means of a bolt 34 which serves as a pivot pin about which the pipe member 33 may swivel. Additional pipe members 33 are pivoted or pinned together outwardly of the inner pipe 33. If so desired, additional lengths of pipe members may be added to the pipe member 33 by means of pivot pins 35 adapted to project vertically through the pipe 33 adjacent its outer end. As with the unloader chain 8, cutter knives 8a are secured to the outer end of pipe arms 32 to cut and dislodge the material stored in the structure in which the unloader is located.

Figure 8:
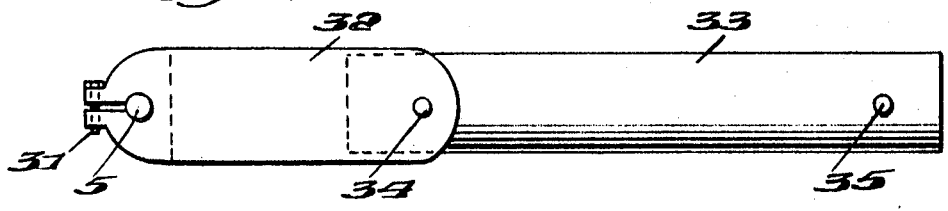
FIG. 8 is a top plan view of the pipe type cutter arm and its mounting, as shown in FIG. 7.

FIGURE 8 is a top plan view looking downward on the device shown in FIGURE 7.

The invention is further illustrated in FIGS. 9, 10, 11 and 12. Referring to these figures, a discharge tunnel 36 extends centrally in and across the base or foundation 37 of the generally cylindrical storage structure 38 which also provides a floor 39 for structure 38. Tunnel 36 is illustrated as permanently closed at one end and is closed at the other end with an access door 40 which when closed seals the opening against entry of air into the tunnel. Discharge tunnel 36 is of a size to permit a man to satisfactorily work in it and to handle unloader apparatus which it may be necessary to pass through the tunnel for repair purposes.

The upper portion of the tunnel 36 is closed by the plate 39 supported by foundation 37, and access to the tunnel 36 from inside the structure is obtained through a plurality of longitudinally spaced discharge openings 41 in plate 39 for passage of material from the structure into the tunnel 36. The plate 39 and the upper portion of foundation 37 provide a floor for storage structure 38. The size of openings 41 may be regulated by adjustable discharge doors or gates 42 which are provided for each opening 41 which generally are transversely of greater length in the extent across the tunnel 36. The doors 42 are shown in FIG. 10 as being adjustable transversely of the openings 41, and they also can be disposed in connection with openings 41 to be adjusted longitudinally of the openings.

A driven shaft 43 extends upwardly generally centrally of the foundation 37 from a gear box 44 which overlies tunnel 36 and is removably secured to the foundation 37 at the center of the structure. The shaft 43 is supported within gear box 44 in suitable bearings 45, and driven through gears 46 in the gear box which are in turn driven by drive shaft 47 extending to the outside of the structure and suitably connected to the driving motor 48. The speed of motor 48 may be regulated or varied to drive shaft 43 at different rates of speed depending on the kind of material which is to be unloaded from the structure and possibly on the initial and final driving speed required in shaft 43 in the unloading operation.

The unloader 49, shown in FIGS. 9–12 corresponds to chain 8 and pipe arms 33 and cutter member 8a, previously described, and in general comprises an unloader arm 50 formed from heavy chain such as linked track chain wherein spaced pins 51 lying in one plane are joined or connected by side bars 52 extending in a plane at right angles to the plane of the pins 51. The chain is turned on edge in service, so that the pins 51 lie in a vertical plane and the side members 52 in a horizontal plane. When extended, the arm 50 is rigid vertically and has substantially no sag to it in the vertical direction. However, the linkage of the chain permits the parts of the arm 50 to flex upon themselves in a lateral direction. The flexible nature of the arm 50 is well illustrated in FIG. 11 where the unloader 49 is shown wrapped upon itself around the central driven shaft 43.

Besides the unloader arm 50, the unloader has a cutter member 53 pivoted to the outer end of the arm 50 for engaging and dislodging the material sought to be unloaded from the structure. The cutter member 53, shown in FIG. 12, corresponds to that shown in FIGS. 5 and 6 but represents another embodiment of this portion of the invention.

In general, cutter member 53 is provided with the large laterally spaced cutter knives 54 which are joined together by a generally centrally located spacer bar or tube 55. An additional knife 56 is in turn welded to spacer tube 55 and extends outwardly between knives 54. All three of the knives taper to a generally sharp point and are curved outwardly from the body of the knife in somewhat of a reversed bend. The inner ends of cutter knives 54 are pivoted to the pin 51 at the outer end of arm 50 by the bar 57 which extends through holes in the knives 54 and through pin 51. Plates 58 are disposed over the opposite ends of bar 57 and are secured to the bar 57 to hold it within pin 51. The principal feature of cutter member 53, as is also true of cutter knives 25, is that the member is self cleaning and does not tend to clog up with the material being dislodged.

The inner end of the arm 50 of unloader 49 is pivoted to the clamp 59, and the latter in turn is clamped to the driven shaft 43 at a vertical position spaced from the floor 39 as may be observed in FIG. 9.

Unloader 49 is completed by a series of flexible scraper pads 60 of belting or rubber-like material which are bolted onto the unloader arm 50 in longitudinally spaced relationship and extend downwardly therefrom a distance sufficient to scrape loosened material into the discharge openings 41 as the unloader 49 is rotated over the floor of the storage structure provided by foundation 37 and plate 39. A conical shield 21, such as that shown in FIGS. 3 and 4, or of flat construction, as shown in FIG. 9, may be provided over driven shaft 43 to prevent clogging of the unloader in the position illustrated in FIG. 11 when certain types of material are stored in the structure and required to be unloaded. The flat shield 21 in FIG. 9 may also be provided on its upper surface with the distributor 22 described in connection with conical shield 21 and rotates with shaft 43.

Material dislodged and discharged from the structure passes through the discharge openings 41 and into discharge tunnel 36. FIG. 2 illustrates one construction for removing the discharge material from the tunnel, and FIG. 9 shows another embodiment of removal apparatus. In FIG. 9, the removal or discharge apparatus provided is an endless conveyor 61 which has spaced upright blades 62 which engage and carry the material off for discharge through the opening normally closed by access door 40. The conveyor 61 is suitably located in the bottom of tunnel 36 and by means of the support structure 63 disposed on the floor 4 is rotated from motor 64 through the drive means 65. Instead of an endless conveyor, it is also feasible to employ a conveyor which would only extend from the center of the tunnel such as an auger or the like to receive material discharged through openings 41 on only one side of tunnel 36.

In the unloading sequence of operations, when the silo or other storage structure is initially filled with material, the cantilevered unloader 49 will normally be wound or coiled around itself on shaft 43, as shown in FIG. 11. As unloading starts, the unloader 49 will unwind or uncoil from shaft 43 and cut an initial cavity in the material to form a dome or arch surrounding shaft 43, and unloader 49 in this step of the operation will in most cases be operated at a low speed and high torque. Then this cavity will be gradually and progressively enlarged as unloader 49 is rotated at in most cases a progressively increasing speed and moves or uncoils outwardly under the centrifugal force applied to it through rotation of shaft 43 until the unloader 49 assumes a position much like that shown in FIG. 9. An enlarged dome or arch over that of the initial dome will then have been formed in the material. Then the cutter member 53, as the unloader 49 is rotated will cut the supporting base of the dome of the material, and the material will move down as a column or fall from the dome or bridge of material which has been formed. In the event that the dislodged material is of a thickness to effect resistance to the rotating movement of unloader 49, the unloader 49 will again wrap itself around the central shaft 43, and then again gradually work its way outwardly to the wall of the structure under the centrifugal force applied to it by rotating shaft 43 and again form a cavity with a resulting arching of the stored material which cavity is again gradually enlarged.

It will be clear from the foregoing that this mechanism for handling ensilage or other forage or industrial materials and removing them from within a silo is capable of saving manual labor which otherwise must be exerted within a silo and frequently under conditions of extremely high temperature and also that the loosened material may be conveyed by this mechanism from within the silo to any desired destination and without the loss of human energy.

I claim:

1. A bottom unloader for silos and the like, comprising a cantilevered vertically rigid laterally flexible unloader arm capable of coiling and uncoiling upon itself in service, clamping means at the inner end of the unloader arm adapted to secure the arm to power means to rotate the arm, a plurality of cutter knives secured to the outer end of said arm and disposed in substantially parallel spaced horizontal planes, said knives being formed of essentially flat surfaces and tapering to a generally sharp point and being curved rearwardly toward the unloader arm, and at least one additional knife secured in spaced relation between the first named knives in a different horizontal plane and tapered to a generally sharp point and curved rearwardly toward the unloader arm with the spacing between the knives providing for self-cleaning of the knives and preventing clogging of said knives in service.

2. A bottom unloader for silos and the like, comprising a cantilevered vertically rigid laterally flexible unloader arm capable of coiling and uncoiling upon itself in service, clamping means secured to one end of the unloader arm adapting said arm to be connected to power means to rotate the arm, and longitudinally spaced flexible pads secured at their upper ends to the unloader arm and extending downwardly from said arm to sweep dislodged material over the floor of the structure for discharge therefrom.

3. In apparatus for bottom unloading of stored material from a silo-like storage structure having a circular flat floor closing the entire bottom of the structure, a rotatable vertical shaft supported generally centrally of the lower part of the structure and extending upwardly from said floor, power means for driving said shaft, a bottom unloader mounted at one end on said vertical shaft above the floor and with the other end free, said unloader including a substantially vertically rigid cantilevered laterally flexible unloader arm capable of coiling and uncoiling upon itself in service and extending from the shaft over said floor to substantially the wall of the structure with cutter means on the outer free end of the arm, at least one longitudinally extending opening provided in the floor of the structure outwardly from the vertical shaft to substantially the wall of said structure for discharge of material through the floor which has been dislodged by said unloader, means dividing the opening into a plurality of spaced apertures, and closure means disposed over said apertures and adapted to be adjusted to various positions within each opening to regulate the size of the apertures for controlled discharge of material therethrough as the unloader rotates circumferentially over the floor and sweeps the stored materials into the apertures to thereby adapt the storage structure to store and discharge various types of materials.

4. In apparatus for bottom unloading of stored material from a silo-like storage structure having a floor closing the bottom of the structure, a rotatable vertical shaft supported generally centrally of the lower part of the structure and extending upwardly from said floor, power means for driving said shaft, a bottom unloader mounted at one end on said vertical shaft above the floor with the other end free and carrying cutter means thereon, said unloader including a substantially vertically rigid cantilevered laterally flexible unloader arm capable of coiling and uncoiling upon itself and around said vertical shaft in service and disposed to be coiled around said shaft when the structure is in the process of being filled with material to be stored, and a shield member disposed over the upper end of the shaft and of a diameter to substantially overlie the complete unloader when the latter is coiled around the shaft, the shield member and coiled unloader cooperating to prevent flow of stored material into the immediate space surrounding the shaft when the structure is being filled to provide an area free of material for the coiled unloader to operate in upon initial start-up after filling of the structure.

References Cited

UNITED STATES PATENTS

| | | | |
|---|---|---|---|
| 439,773 | 11/1890 | Cole | 222—412 |
| 3,278,056 | 10/1966 | Beucler et al. | 214—83.2 |
| 3,379,323 | 4/1968 | Knutsen | 214—17 |
| 3,394,824 | 7/1968 | Mast | 214—17 |

FOREIGN PATENTS 101,986  4/1963  Norway.

ROBERT G. SHERIDAN, Primary Examiner

U.S. Cl. X.R.

222—228, 410